(12) United States Patent
Oniki et al.

(10) Patent No.: US 9,654,707 B2
(45) Date of Patent: May 16, 2017

(54) IMAGE PROCESSING APPARATUS, IMAGE CAPTURING APPARATUS, IMAGE PROCESSING METHOD AND STORAGE MEDIUM STORING IMAGE PROCESSING PROGRAM

(71) Applicant: CANON KABUSHIKI KAISHA, Tokyo (JP)

(72) Inventors: Takashi Oniki, Utsunomiya (JP); Koshi Hatakeyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/882,813

(22) Filed: Oct. 14, 2015

(65) Prior Publication Data

US 2016/0110851 A1 Apr. 21, 2016

(30) Foreign Application Priority Data

Oct. 21, 2014 (JP) ................................. 2014-214688

(51) Int. Cl.
*G06T 5/00* (2006.01)
*H04N 5/357* (2011.01)
*G06T 5/20* (2006.01)

(52) U.S. Cl.
CPC ........... *H04N 5/3572* (2013.01); *G06T 5/003* (2013.01); *G06T 5/20* (2013.01);
(Continued)

(58) Field of Classification Search
None
See application file for complete search history.

(56) References Cited

U.S. PATENT DOCUMENTS 8,169,516 B2 5/2012 Feng et al.
8,391,637 B2 3/2013 Kinoshita
(Continued)

FOREIGN PATENT DOCUMENTS

JP 2009177332 A 8/2009
JP 2010028814 A 2/2010
(Continued)

OTHER PUBLICATIONS

Extended European Search Report issued in European Appln. No. 15002964.3, mailed Mar. 8, 2016.
(Continued)

*Primary Examiner* — Mark T Monk
(74) *Attorney, Agent, or Firm* — Rossi, Kimms & McDowell LLP

(57) ABSTRACT

The image processing apparatus performs an image process on a first image produced by image capturing. The apparatus includes: a memory storing coefficient data containing coefficients to be used in an approximation function to approximate a PSF of an image capturing optical system, and a processor performs the image process. The processor produces an approximated point spread function by using the coefficient of the coefficient data corresponding to an optical state of the optical system in the image capturing and two of a pixel pitch of an image sensor, a kernel size of a filter to be used for a sharpening process on the first image and number of taps of the filter; produce the filter by using the approximated PSF; and produce a second image that is a sharpened image by applying the filter to the first image.

11 Claims, 11 Drawing Sheets

(52) U.S. Cl.
CPC ............... *G06T 2207/10024* (2013.01); *G06T 2207/20012* (2013.01); *G06T 2207/20021* (2013.01)

(56) References Cited

U.S. PATENT DOCUMENTS

| | | | |
|---|---|---|---|
| 8,416,335 B2 | 4/2013 | Watanabe | |
| 2007/0279618 A1* | 12/2007 | Sano | ........................ G06T 5/003 356/72 |
| 2009/0046944 A1 | 2/2009 | Bilcu et al. | |
| 2010/0053350 A1* | 3/2010 | Miyauchi | ........... G02B 27/0075 348/222.1 |
| 2014/0218557 A1 | 8/2014 | Ebe | |

FOREIGN PATENT DOCUMENTS

| | | |
|---|---|---|
| JP | 2010081263 A | 4/2010 |
| JP | 2011135188 A | 7/2011 |
| JP | 2012003454 A | 1/2012 |
| JP | 2012073691 A | 4/2012 |

OTHER PUBLICATIONS

Office Action issued in Japanese Appln. No. 2014-214688 mailed Sep. 13, 2016. English translation provided.

* cited by examiner

COEFFICIENT TABLE FOR PSF
RECONSTRUCTION

| COEFFICIENT : | a | b | $\mu$ | $\eta$ | $\sigma$ |
|---|---|---|---|---|---|
| IMAGE HEIGHT 1 | C1[0] | C1[1] | C1[2] | C1[3] | C1[4] |
| IMAGE HEIGHT 2 | C2[0] | C2[1] | C2[2] | C2[3] | C2[4] |
| IMAGE HEIGHT 3 | C3[0] | C3[1] | C3[2] | C3[3] | C3[4] |
| . | . | . | . | . | . |
| IMAGE HEIGHT 10 | C10[0] | C10[1] | C10[2] | C10[3] | C10[4] |

FIG. 11

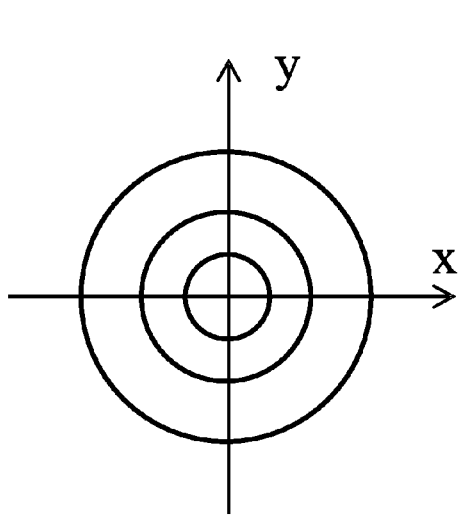
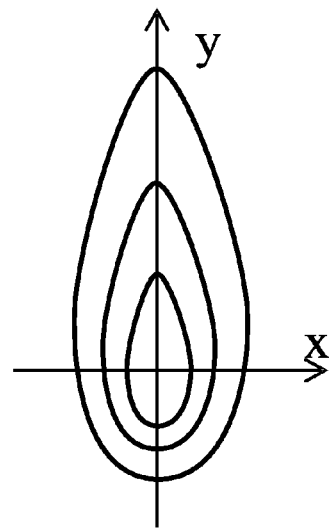
FIG. 12A          FIG. 12B
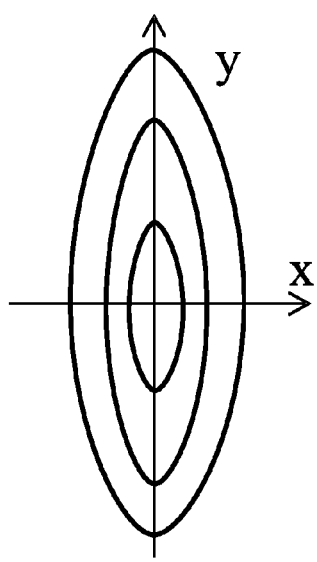
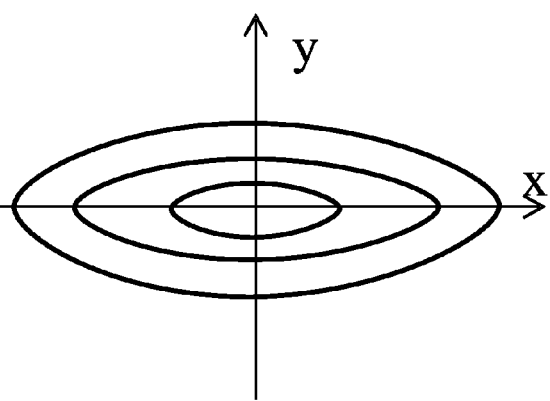
FIG. 12C          FIG. 12D

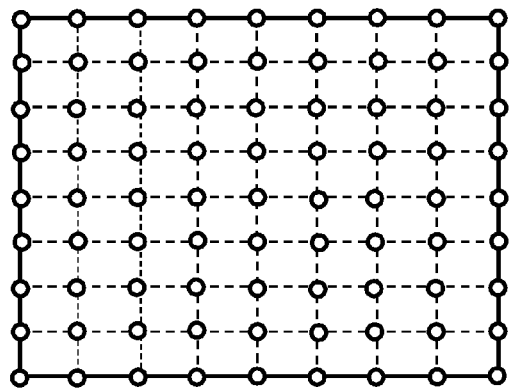
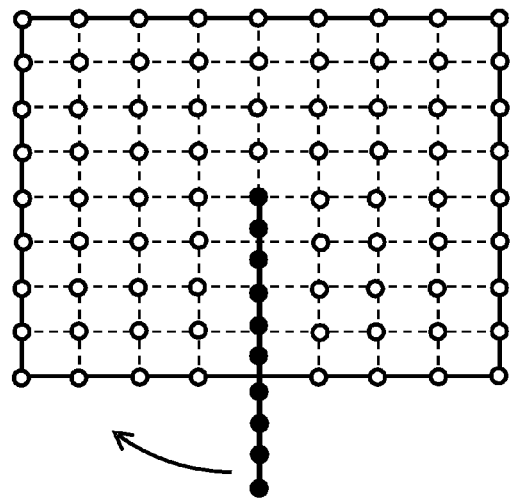
FIG. 15A  FIG. 15B
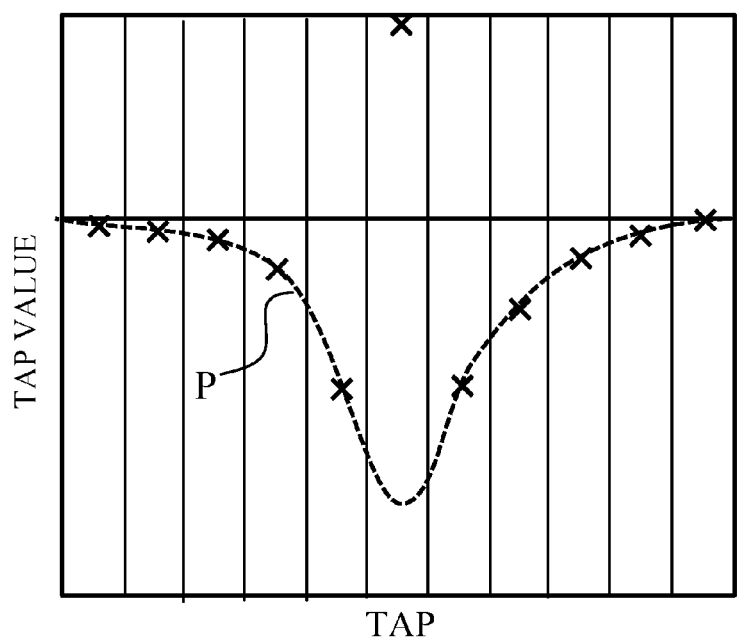
FIG. 16

IMAGE PROCESSING APPARATUS, IMAGE CAPTURING APPARATUS, IMAGE PROCESSING METHOD AND STORAGE MEDIUM STORING IMAGE PROCESSING PROGRAM

BACKGROUND OF THE INVENTION

Field of the Invention

The present invention relates to an image processing technique of sharpening an image produced by image capturing.

Description of the Related Art

One example of a method of sharpening an image is an unsharp masking process that adds to or subtracts from an original image a difference between an unsharpened image blurred by applying an unsharp mask to the original image and the original image to produce a sharpened image. In this process, an image area having a larger difference between the unsharpened image and the original image is more sharpened.

Japanese Patent Laid-Open No. 2010-081263 discloses a method of applying a one-dimensional correction filter asymmetric with respect to pixel signals arranged in a row in an image height direction (i.e., in a meridional azimuth direction) to reduce an influence of a point spread function (PSF) of an optical system on the pixel signal row.

Furthermore, Japanese Patent Laid-Open No. 2012-073691 discloses a method of reconstructing, depending on coefficient data and information of an image sensor, an optical transfer function (OTF) to be used to produce an image restoration filter.

However, conventional unsharp masking processes uses a rotationally symmetric filter as the unsharp mask and thus have a difficulty in sharpening an image degraded due to an influence of a complex-shaped PSF, such as an asymmetric aberration and a sagittal halo. That is, correcting the aberration generated in one azimuth direction in which the aberration is large generates an undershoot in another azimuth direction in which the aberration is small. Conversely, reducing the undershoot makes it impossible to sufficiently correct the aberration.

The method disclosed in Japanese Patent Laid-Open No. 2010-081263 takes only asymmetry in the image height direction into consideration and uses the one-dimensional correction filter, which makes it impossible to reduce asymmetry in directions other than the image height direction. Furthermore, this method adjusts the asymmetry of the correction filter by changing number of minus tap coefficients and thus cannot deal with a blur due to the PSF of the optical system, which makes it impossible to sufficiently sharpen the image degraded due to the PSF by correcting the degraded image by the correction filter in the image height direction.

When the image restoration filter is used to correct the degraded image, the method disclosed in Japanese Patent Laid-Open No. 2012-073691 enables reconstructing the OTF with less storage amount. The image restoration filter can be produced depending on the OTF. Conversely, since the PSF can be acquired by performing a Fourier transform on the OTF, the method disclosed in Japanese Patent Laid-Open No. 2012-073691 enables converting the reconstructed OTF into the PSF. However, since this method requires, as described above, a process of converting a frequency space into a real space, it is desirable to further reduce a processing load.

SUMMARY OF THE INVENTION

The present invention provides an image processing apparatus, an image capturing apparatus and others, each capable of performing a good sharpening process that requires less data storage amount to reconstruct a PSF of an image capturing optical system.

The present invention provides as an aspect thereof an image processing apparatus configured to perform an image process on a first image produced by image capturing through an image capturing optical system. The image processing apparatus includes: a memory storing coefficient data containing coefficients to be used in an approximation function to approximate a point spread function of the image capturing optical system, the coefficients having values different depending on an optical state of the image capturing optical system; and a processor configured to perform the image process. The processor is configured to: produce an approximated point spread function by using the coefficient of the coefficient data corresponding to the optical state in the image capturing and two of a pixel pitch of an image sensor used for the image capturing, a kernel size of a filter to be used for a sharpening process on the first image and number of taps of the filter; produce the filter by using the approximated point spread function; and produce a second image that is a sharpened image by applying the filter to the first image.

The present invention provides as another aspect thereof an image capturing apparatus including an image sensor configured to perform image capturing through an image capturing optical system, and the above image processing apparatus.

The present invention provides as yet another aspect thereof an image processing method configured to perform an image process on a first image produced by image capturing through an image capturing optical system. The method includes: providing coefficient data containing coefficients to be used in an approximation function to approximate a point spread function of the image capturing optical system, the coefficients having values different depending on an optical state of the image capturing optical system; and performing the image process. The image process includes: producing an approximated point spread function by using the coefficient of the coefficient data corresponding to the optical state in the image capturing and two of a pixel pitch of an image sensor used for the image capturing, a kernel size of a filter to be used for a sharpening process on the first image and number of taps of the filter; producing the filter by using the approximated point spread function; and producing a second image that is a sharpened image by applying the filter to the first image.

The present invention provides as still another aspect thereof a non-transitory computer-readable storage medium storing an image processing program as a computer program configured to cause a computer to: provide coefficient data containing coefficients to be used in an approximation function to approximate a point spread function of an image capturing optical system, the coefficients having values different depending on an optical state of the image capturing optical system; and perform the image process. The image process includes: producing an approximated point spread function by using the coefficient of the coefficient data corresponding to the optical state in the image capturing and two of a pixel pitch of an image sensor used for the image capturing, a kernel size of a filter to be used for a sharpening process on the first image and number of taps of the filter; producing the filter by using the approximated point spread function; and producing a second image that is a sharpened image by applying the filter to the first image.

Further features and aspects of the present invention will become apparent from the following description of exemplary embodiments with reference to the attached drawings.

BRIEF DESCRIPTION OF THE DRAWINGS

FIG. 11 illustrates coefficient data.

FIGS. 12A to 12D are contour diagrams of a point spread function.

FIGS. 15A and 15B illustrate an interpolation of the unsharp mask.

FIG. 16 is a sectional view of a correction signal.

DESCRIPTION OF THE EMBODIMENTS

Exemplary embodiments of the present invention will be described below with reference to the attached drawings.

Figures 3A, 3B:
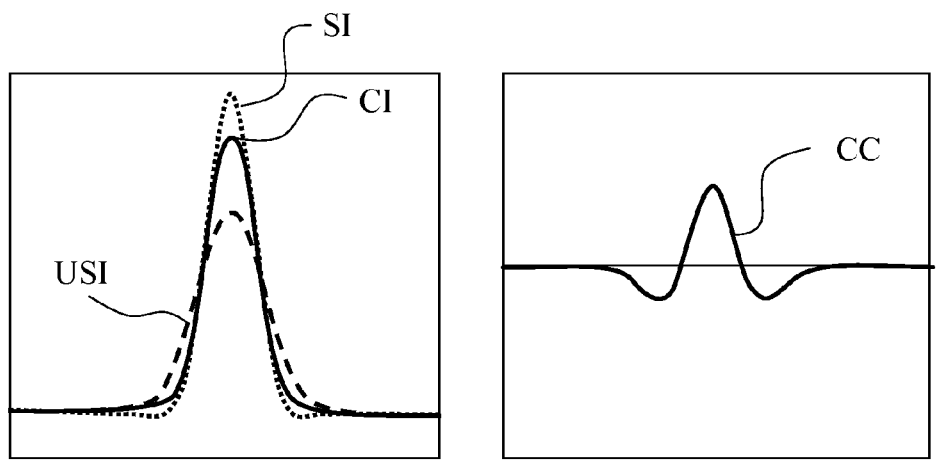
FIGS. 3A and 3B illustrate sharpening by an unsharp masking process.

Prior to describing two specific embodiments, description will be made of an unsharp masking process (sharpening process) performed in each of the embodiments. FIGS. 3A and 3B illustrate an example of image sharpening by the unsharp masking process. In FIG. 3A, a solid line indicates an input image CI as a first image produced by image capturing through an image capturing optical system, a dashed line indicates an unsharpened image USI blurred by unsharpening the input image with the unsharp mask, and a dotted line indicates a sharpened image SI produced by sharpening the unsharpened image. In FIG. 3B, a solid line indicates a correction component CC to be used to sharpen the input image.

When $f(x,y)$ represents the input image, and $h(x,y)$ represents the correction component, a sharpened image $g(x,y)$ can be expressed by the following expression:

$$g(x,y) = f(x,y) + m \times h(x,y). \qquad (1)$$

In expression (1), m represents a constant. Varying a value of m enables adjusting a degree of effect (gain) of a correction component $h(x,y)$ on the input image $f(x,y)$, namely, a correction amount.

The constant m may be a constant that is invariant regardless of a position of the input image. The correction amount may be adjusted depending on the position of the input image by using an adjustment coefficient $m(x,y)$ different depending on the position of the input image. Alternatively, the constant m and the adjustment coefficient $m(x,y)$ may be different depending on an image capturing condition including a focal length, an aperture value and an object distance of the optical system. The use of the adjustment coefficient $m(x,y)$ instead of the constant m is applicable also in the following description.

When USM represents the unsharp mask, and symbol * represents a convolution (convolution integral), the correction component $h(x,y)$ can be expressed as:

$$h(x,y) = f(x,y) - f(x,y) * USM(x,y). \qquad (2)$$

Transforming a right side of expression (2) enables expressing the correction component $h(x,y)$ by the following expression:

$$h(x,y) = f(x,y) * (\delta(x,y) - USM(x,y)). \qquad (3)$$

In expression (3), $\delta$ represents a delta function (ideal point image). The delta function used in expression (3) is data shown by taps whose number is the same as that of USM$(x,y)$. Of the taps, a central tap has a value of 1 and the other taps have a value of 0.

Expression (3) different from expression (2) in a calculation method as a process can be expressed by transforming expression (2). This fact shows that expressions (2) and (3) can be regarded as mutually equivalent processes. For this reason, description will be made below of production of the correction component by using expression (2).

Expression (2) expresses the production of the correction component $h(x,y)$ by acquisition of a difference between the input image $f(x,y)$ and the unsharpened image produced by unsharpening the input image $f(x,y)$ by the unsharp mask USM. Typical unsharp masking processes use, as the unsharp mask USM, a smoothing filter, such as a Gaussian filter, a median filter and a moving average filter. For instance, when the Gaussian filter as the unsharp mask USM is used for the input image $f(x,y)$ indicated by the solid line CI, the unsharpened image is indicated by the dashed line (USI) in FIG. 3A. In this case, the correction component $h(x,y)$ is the difference between the input image $f(x,y)$ and the unsharpened image as expressed by expression (2). For this reason, subtracting the dashed line (USI) in FIG. 3A from the solid line (CI) enables acquiring a correction component CC expressed by a solid line of FIG. 3B. Calculating expression (1) by using the correction component calculated in this manner enables sharpening the input image $f(x,y)$ indicated by the solid line (CI) of FIG. 3A, as indicated by a dotted line (SI).

Next, description will be made of a case of performing the unsharp masking process on the image degraded by the image capturing optical system to produce the sharpened image.

When $I(x,y)$ represents an original image (object) before image capturing, and $psf(x,y)$ represents a point spread function (PSF) of the image capturing optical system, the input image $f(x,y)$ produced by the image capturing through the image capturing optical system can be expressed as:

$$f(x,y) = I(x,y) * psf(x,y). \qquad (4)$$

In this case, when the image capturing optical system is a rotationally symmetric coaxial optical system, a PSF corresponding to a central area of the input image is rotationally symmetric. For this reason, applying the above-described rotationally symmetric unsharp mask USM to the central area of the input image enables performing the sharpening process that reconstructs the input image f(x,y) closer to the original image I(x,y). In the sharpening process, the correction amount is a difference value between the input image and the unsharpened image blurred by unsharpening the input image with the unsharp mask. For this reason, in order to correct (sharpen) the input image with higher accuracy, rather than using a simple smoothing filter as the unsharp mask USM, it is better to use a filter whose shape is close to that of psf(x,y), in other words, a filter corresponding to the PSF. For instance, when the input image is degraded due to an influence of a spherical aberration, though the spherical aberration affects on the input image rotationally symmetrically, a smoothing filter such as a Gaussian filter has a distribution shape different from that of a PSF affected by the spherical aberration. For this reason, even when reducing an influence of such a rotationally symmetric blur, using the filter corresponding to the PSF of the image capturing optical system enables correcting the input image with better accuracy.

Therefore, each of the embodiments uses the filter corresponding to the PSF as the unsharp mask USM. Although the input image f(x,y) indicated by the solid line (CI) in FIG. 3A, which is used to describe the unsharp masking process, has a symmetrical shape, the input image does not have to have such a symmetrical shape. Even when the original image I(x,y) has an asymmetric shape, the input image can be sharpened by using the rotationally symmetric unsharp mask USM as long as a degradation function corresponding to psf(x,y) that degrades the original image I(x,y) is rotationally symmetric.

Figure 4A:
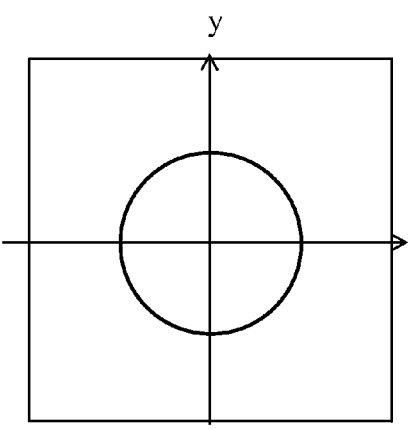
FIGS. 4A and 4B illustrate a PSF of an image capturing optical system in an x-y plane.
Figure 4B:
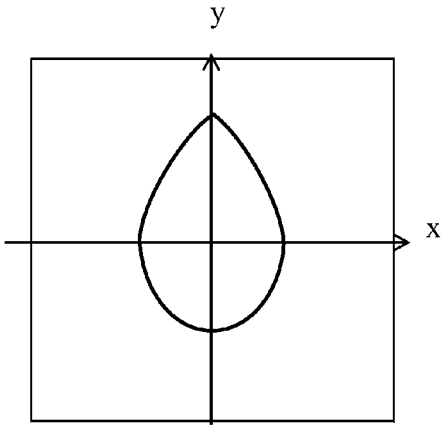

On the other hand, even when the image capturing optical system is a rotationally symmetric coaxial optical system, the PSF typically has an asymmetric shape in areas of the input image other than the central area thereof. FIGS. 4A and 4B illustrate an example of the PSF of the image capturing optical system in an x-y plane. FIG. 4A illustrates an axial PSF, and FIG. 4B illustrates an off-axis PSF.

For instance, when the original image (object) is an ideal point image, the input image f(x,y) corresponds to the PSF of the image capturing optical system as expressed by expression (4). When the ideal point image is present at a field angle corresponding to FIG. 4B, and therefore the original image (object) is degraded due to the influence of the PSF of the image capturing optical system, the input image produced by the image capturing becomes an asymmetrically blurred image as illustrated in FIG. 4B. Description will be made of a case of performing the sharpening by the unsharp masking process on the above-described asymmetrically blurred image.

Figure 5A:
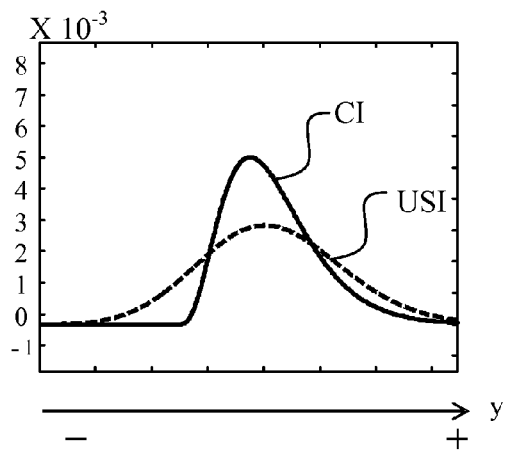
FIGS. 5A to 5C illustrate a sharpening process using a rotationally symmetric unsharp mask.
Figure 5B:
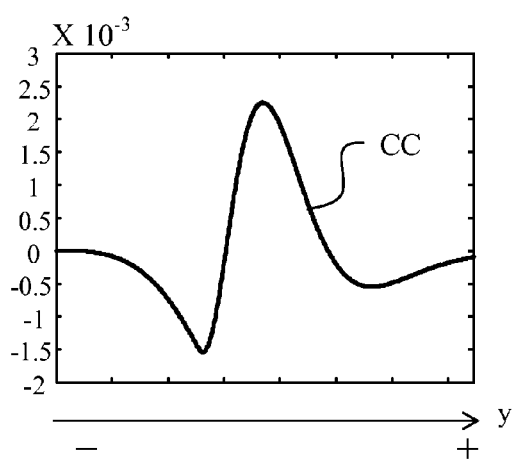
Figure 5C:
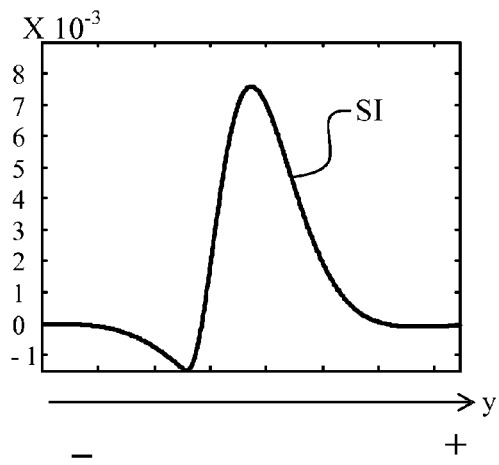
Figure 6A:
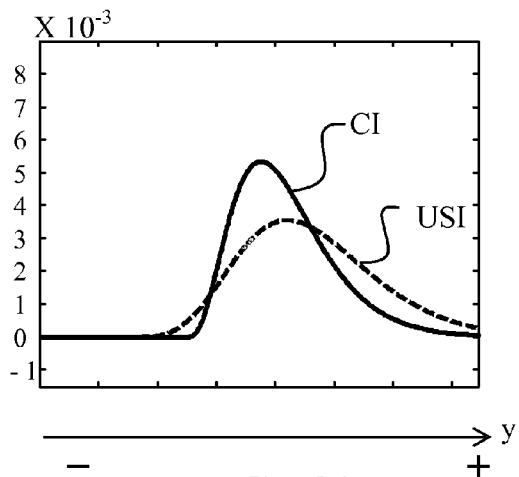
FIGS. 6A to 6C illustrate a sharpening process using a rotationally asymmetric unsharp mask.
Figure 6B:
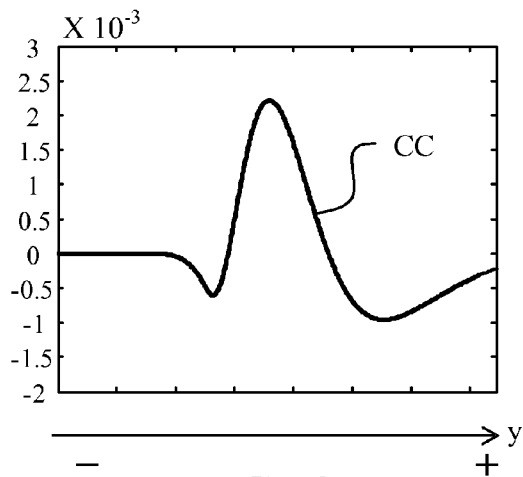
Figure 6C:
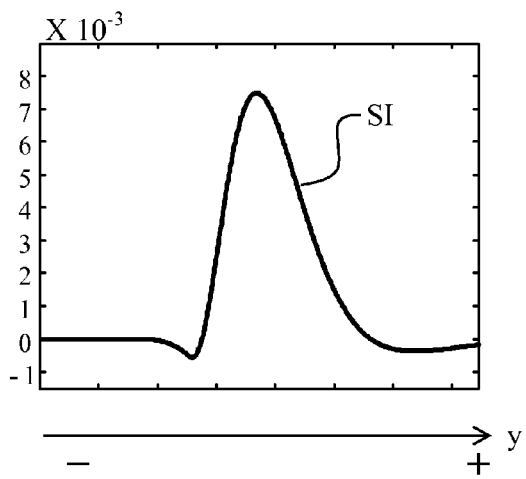

FIGS. 5A, 5B, 5C, 6A, 6B and 6C illustrate examples of unsharpening processes performed on an asymmetrically degraded (blurred) input image. FIGS. 5A, 5B and 5C illustrate the unsharpening process performed by using the rotationally symmetric unsharp mask, and FIGS. 6A, 6B and 6C illustrate the unsharpening process performed by using the rotationally asymmetric unsharp mask.

In FIGS. 5A and 6A, a solid line indicates a section of the asymmetrically blurred input image CI illustrated in FIG. 4B in a y axis direction, and a dotted line indicates an unsharpened image USI produced by unsharpening the input image by using the unsharp mask. As the rotationally symmetric unsharp mask in FIG. 5A, a Gaussian filter is used. On the other hand, as the rotationally asymmetric unsharp mask in FIG. 6A, the PSF of the image capturing optical system is used.

In FIGS. 5B and 6B, a solid line indicates a difference value between the input image and the unsharpened image produced by unsharpening the input image by using the rotationally symmetric unsharp mask (FIG. 5B) or the rotationally asymmetric unsharp mask (FIG. 6B); the difference value corresponds to the correction component CC. A side on which the input image CI illustrated in FIGS. 5A and 6A is blurred due to the PSF and thus its bottom is broadened is hereinafter referred to as "a plus side" in the y axis direction.

When the rotationally symmetric unsharp mask is used as illustrated in FIG. 5A, the difference value between the input image CI and the unsharpened image USI is small on the plus side with respect to a peak position of the solid line (CI) and is large on a minus side with respect thereto. For this reason, the correction component CC illustrated in FIG. 5B has a smaller extreme value on the minus side with respect to a center peak position than on the plus side. As can be understood from a comparison between FIGS. 5A and 5B, a correction amount corresponding to the correction component CC is small on a plus side part of the input image CI and is large on a minus side part thereof on which the bottom of the input image CI is broadened. For this reason, such a correction component CC makes it impossible to sufficiently correct the asymmetric blur by performing the sharpening according to expression (4).

A solid line of FIG. 5C indicates a sharpened image SI produced by sharpening the unsharpened image with the correction component CC when m=1. This drawing shows that though the sharpened image SI is more sharpened than the input image CI indicated by the solid line in FIG. 5A, the asymmetric blur is not corrected because the solid line in FIG. 5C is more significantly concave on the minus side than on the plus side. One applicable method of adjusting the correction amount without changing the unsharp mask is a method of changing the constant m of expression (1). However, setting the value of the constant m to be large in order to sufficiently correct the plus side part of the input image results in an excessive correction (undershoot) in the minus side part of the input image. Conversely, setting the value of the constant m so as to make the correction amount of the minus side part of the input image appropriate cannot sufficiently correct the plus side part of the input image, which results in a deficient correction.

As described above, performing the unsharp masking process on the asymmetrically blurred input image by using the rotationally symmetric unsharp mask makes it difficult to reduce the asymmetry of the input image so as to sharpen the input image. Although the description here has been made of the case of using the Gaussian filter as the rotationally symmetric unsharp mask, this difficulty arises also in the case of using other types of rotationally symmetric filter and thus makes it impossible to acquire a sufficiently sharpened image from the asymmetrically blurred input image.

When the rotationally asymmetric unsharp mask is used as illustrated in FIG. 6A, the difference value between the input image CI and the unsharpened image USI is large on the plus side with respect to a peak position of the solid line (CI) and is small on the minus side. That is, this relation is inverse to that in FIG. 5A. For this reason, a correction component CC illustrated in FIG. 6B has a smaller extreme value on the plus side with respect to the center peak position than on the minus side. Applying the above-described correction component CC to the input image CI illustrated in FIG. 6A makes the correction amount large on the plus side with respect to the peak position on which the input image CI is more blurred and makes the correction amount small on the minus side on which the input image CI is less blurred. When the asymmetric unsharp mask is used as described above, a balance between levels of the blur of the input image on the plus side and the minus side coincides with a balance between the correction amounts of the correction component on the plus side and the minus side. This coincidence suppresses excess and deficiency in the correction which is a problem in the case of using the rotationally symmetric unsharp mask.

FIG. 6C illustrates the sharpened image SI produced by sharpening the unsharpened image by the correction component CC when m=1. This drawing shows that the sharpened image SI is more sharpened than the input image CI indicated by the solid line in FIG. 6A and that the significant difference between the concave shapes on the minus side and the plus side in FIG. 5C is reduced. Furthermore, since this sharpening results in less excess in the correction compared to the case of using the rotationally symmetric unsharp mask, the value of the constant m of expression (1) can be set to be relatively high, which enables further sharpening while reducing the asymmetricity. Additionally, the balance between the correction amounts of the correction component corresponds to the difference between the unsharpened image and the input image. Therefore, in order to perform the correction with better accuracy, it is necessary, for an area of the input image largely blurred due to the PSF of the image capturing optical system, to be blurred by the unsharp masking more than other areas thereof. As described above, in order to perform the correction with high accuracy, it is ideal to use, as the unsharp mask, the filter corresponding to the PSF of the image capturing optical system.

Next, description will be made of a method of producing the coefficient data to be used to produce the unsharp mask USM, that is, to produce (reconstruct) the PSF. Each of the embodiments uses, as the unsharp mask, the PSF of the image capturing optical system, which varies depending on an optical state of the image capturing optical system such as a focal length, an F-number and an image capturing distance (i.e., a distance from an object to be focused). In addition, the PSF is different depending on an image height. For this reason, when performing the sharpening, it is necessary to use an unsharp mask that corresponds to an image capturing condition (i.e., a combination of the focal length, the F-number, the image capturing distance and others) that is an optical state of the image capturing optical system in the image capturing to produce the input image and that reflects variation in the PSF depending on the image height.

Another possible method for using, as the unsharp mask, the PSF that varies depending on the image capturing condition is to calculate the PSFs for all of mutually different image capturing conditions and select a most suitable one of the PSFs as the unsharp mask. This method, however, requires a vast storage amount for storing data on all the calculated PSFs, which is undesirable.

Alternatively, as described below, each of the embodiments stores data on coefficients contained in a function that approximates the PSF of the image capturing optical system (the function is hereinafter referred to as "an approximation function") and reconstructs the PSF by using the data on the coefficients in the production of the unsharp mask. This alternative method enables performing accurate sharpening that requires less amount of data to be stored.

First, the PSF is calculated for each of the mutually different image capturing conditions. The PSF may be calculated from design data of the image capturing optical system or may be estimated from the input image produced by performing the image capturing of a chart or the like. Then, the calculated PSF is approximated (fitted) by an appropriate approximation function to calculate values of the coefficients contained in the approximation function. The approximation function referred to herein is a continuous function and a function that can express a rotationally asymmetric distribution, but not a rotationally symmetric function such as a Gaussian distribution (normal distribution).

This is because the PSF of the image capturing optical system is not necessarily rotationally symmetric. One example of the approximation function that can express the rotationally asymmetric distribution for approximating the PSF is a function expressed by following expression (5):

$$PSF(x) = F(x) \times G(x) \qquad (5)$$
where
$$F(x) = \frac{1}{1 + \exp(-ax + \mu)} \qquad (6)$$
$$G(x) = \frac{1}{2\sqrt{2\pi\sigma^2}} \exp\left[-\frac{(x-\mu)^2}{2\sigma^2}\right]. \qquad (7)$$

In expressions (5), (6) and (7), "a", "μ" and "σ" represent the coefficients to be used to reconstruct (approximate) the PSF. When a=0, a normal distribution (symmetric distribution) whose average value is "μ" and whose standard deviation is "σ" is provided. When a≠0, an asymmetric distribution is provided. Approximating the PSF by the approximation function enables reproducing a rotationally symmetric PSF and a rotationally asymmetric PSF. That is, in the approximation function having such a coefficient "a" that can vary symmetry of a distribution shape (in other words, that can provide asymmetry to the distribution shape), varying the coefficient "a" enables making the PSF correspond to an asymmetric aberration of the image capturing optical system. Although the approximation function is expressed in one dimension in expression (5), the above description holds also in the case where the approximation function is expressed in two dimensions. When the approximation function is two dimensional, it is only necessary to respectively express F(x) and G(x) as:

$$F(x, y) = \frac{1}{1 + \exp\{(-ax + \mu) + (-by + \eta)\}} \qquad (8)$$
$$G(x, y) = \frac{1}{2\sqrt{2\pi\sigma^2}} \exp\left[-\frac{(x-\mu)^2 + (y-\eta)^2}{2\sigma^2}\right]. \qquad (9)$$

In expressions (8) and (9), μ and σ respectively represent an average value and a standard deviation in an x direction, and η represents an average value in a y direction. Adjusting a and b of F(x,y) enables expressing the asymmetry of the PSF.

FIGS. 12A to 12D illustrate distribution shapes (contour diagrams) of the PSF reconstructed by using expression (5), (8) and (9). FIG. 12A illustrates a rotationally symmetric distribution shape which can be expressed when a=0 and b=0 in expression (8). On the other hand, when such a rotationally asymmetric shape as illustrated in FIG. 12B is to be acquired, setting both a and b in expression (8) to a value other than 0 enables expressing that shape. As illustrated in FIGS. 12C and 12D, when varying a spread ratio of the distribution in a horizontal direction (x direction) and a vertical direction (y direction), it is only necessary to, for example, transform expression (9) into following expression (10) where ξ represents a standard deviation in the y direction:

$$G(x, y) = \frac{1}{2\sqrt{2\pi\sigma^2}} \exp\left[-\frac{(x-\mu)^2}{2\sigma^2} - \frac{(y-\eta)^2}{2\xi^2}\right].$$ (10)

When σ>ξ in expression (10), a distribution shape as illustrated in FIG. 12C that is broadened more in the x direction than in the y direction. On the other hand, when σ<ξ, a distribution shape as illustrated in FIG. 12(D) that is broadened more in the y direction than in the x direction. As described above, performing the fitting using expressions (5), (8), (9) and (10) enables acquiring coefficients of the approximation function to be used to approximate various distribution shapes as illustrated in FIGS. 12A to 12D.

Instead of using, as a model, the approximation function expressed by expression (5) that is used to approximate the PSF, coefficients may be utilized which are calculated by performing the fitting with use of an orthogonalized polynomial as the model.

As described above, for each of the image capturing conditions, the coefficients "a", "μ" and "σ" are calculated in the case of using expressions (6) and (7), the coefficients "b" and "η" are further calculated in the case of using expressions (8) and (9), and the coefficient "ξ" is further calculated in the case of using expression (10). The calculated coefficients are stored in association with the image capturing condition set when the coefficients are calculated. FIG. 11 illustrates a table of the coefficients "a", "b", "μ", "η" and "σ" calculated and stored in association with the image capturing condition in the case of using either of expression (5), (8) or (9) as the approximation function to be used to approximate the PSF. This drawing illustrates the coefficients in a specific image capturing condition (i.e., the focal length, the F-number and the image capturing distance) corresponding to each image height. Similar tables to this table are provided for the respective focal lengths, F-numbers and image capturing distances so as to uniquely fix the coefficients for each of the image capturing conditions.

As described above, in order to approximate the PSF by the approximation function that is the continuous function and reconstruct the PSF by the coefficients of the approximation function, each of the embodiments produces data on the coefficients (hereinafter referred to as "coefficient data") and stores the data. A method of reconstructing the PSF by using the coefficient data will be described later in the specific embodiments.

Next, description will be made of the unsharp masking process in each of the embodiments, of the unsharp mask as an image-blurring filter corresponding to the PSF to be used for the process and of a correction signal as a correction filter corresponding to the PSF.

The sharpened image g(x,y) can be expressed according to expressions (1) and (2) by the following expression:

$$g(x,y)=f(x,y)+m\times[f(x,y)-f(x,y)*USM(x,y)]$$ (11)

or can be expressed according to expressions (1) and (3) by the following expression:

$$g(x,y)=f(x,y)+m\times f(x,y)*[\delta(x,y)-USM(x,y)].$$ (12)

Furthermore, transforming expression (12) enables expressing it as:

$$g(x,y)=f(x,y)*[\delta(x,y)+m\times(\delta(x,y)-USM(x,y))].$$ (13)

Expression (13) can be transformed as the following expression:

$$g(x,y)=f(x,y)*[(1+m)\times\delta(x,y)-m\times USM(x,y)].$$ (13')

Since expressions (11), (12), (13) and (13') express mutually equivalent processes, each of the embodiments will describe the unsharp masking process (sharpening process) using expression (13). In each of the embodiments, USM (x,y) in expression (13) represents the unsharp mask, and the bracketed portion in the same expression represents the correction signal.

Embodiment 1

Figure 1:
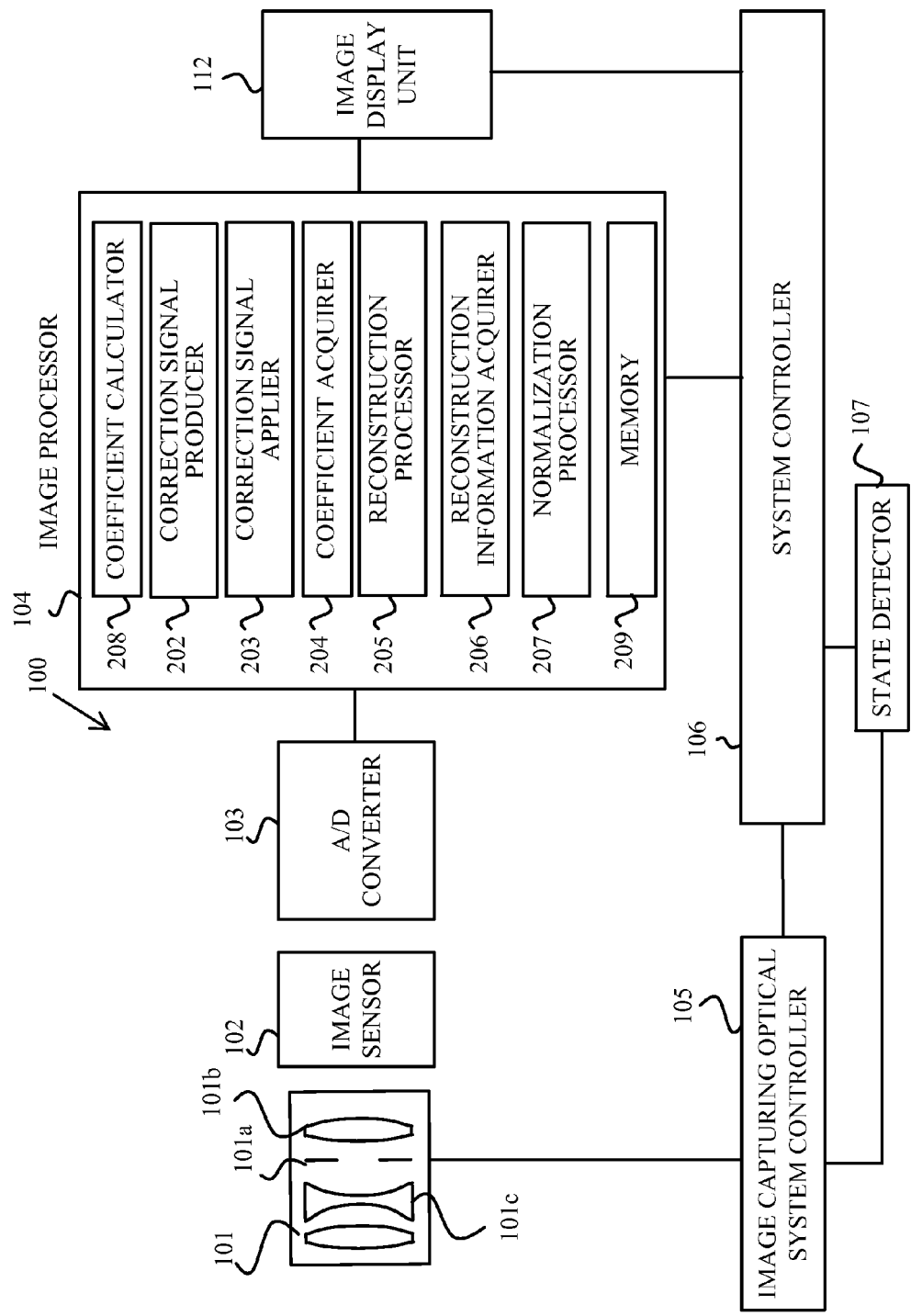
FIG. 1 is a block diagram illustrating a configuration of an image capturing apparatus that is Embodiment 1 of the present invention.

FIG. 1 illustrates a configuration of an image capturing apparatus 100 including an image processing apparatus that is a first embodiment (Embodiment 1) of the present invention. The image capturing apparatus 100 includes an image capturing optical system 101 constituting an image capturing lens, an image sensor 102, an image processor 104 as the image processing apparatus and a system controller 106. The image capturing optical system 101 includes an aperture stop 101a, a focus lens 101b and a magnification-varying lens 101c. Although this embodiment will describe a lens-integrated image capturing apparatus, an unsharp masking process described later may be performed by a lens-interchangeable image capturing apparatus in which the image capturing lens is interchangeably attached to an image capturing apparatus main body.

Into the image capturing optical system 101, an optical element, such as a low-pass filter and an infrared-cutting filter, may be inserted. When the optical element, such as the low-pass filter, which influences a characteristic of the PSF, is to be inserted, producing an unsharp mask with consideration of the influence of the optical element enables performing the unsharp masking process with higher accuracy. Since the infrared-cutting filter influences PSFs of RGB channels, which are integral values of PSFs of spectral wavelengths, in particular, the PSF of the R channel, it is more desirable to take the influence of the infrared-cutting filter into consideration in the production of the unsharp mask.

The image sensor 102 is a two-dimensional image sensor constituted by a CCD sensor, a CMOS sensor or the like. The image sensor 102 captures (photoelectrically converts) an object image formed by the image capturing optical system 101. An analog image capturing that is an output signal from the image sensor 102 is converted by an A/D converter 103 into a digital image capturing signal. The digital image capturing signal is input to the image processor 104.

The image processor 104 performs a predetermined image process on the input digital image capturing signal to produce an input image (first image) and performs the unsharp masking process on the input image to produce a sharpened image (second image). The input image is an image produced by the image capturing through the image capturing optical system 101.

First, the image processor 104 acquires, from a state detector 107, information on an image capturing condition necessary to produce the input image that shows a state of the image capturing optical system 101 in the image capturing. As described above, the image capturing condition is the optical state of the image capturing optical system 101 in the image capturing and includes the focal length, the F-number, the image capturing distance and others. The state detector 107 may acquire the information showing the image capturing condition from either of the system controller 106 or an image capturing optical system controller 105 described later.

A memory 209 is provided inside the image processor 104. The memory 209 stores the above-described coefficient data for each image capturing condition necessary to produce the unsharp mask or produce the correction signal. The coefficient data is calculated by a coefficient calculator 208 provided inside the image processor 104 and then stored in the memory 209. Alternatively, the memory 209 and the coefficient calculator 208 may be provided outside the image processor 104.

Next, the image processor 104 performs the unsharp masking process on the input image. The image processor 104 includes a correction signal producer 202, a correction signal applier 203, a coefficient acquirer 204, a reconstruction processor 205, a reconstruction information acquirer 206 and a normalization processor 207 in addition to the above-described coefficient calculator 208 and memory 209. Constituent elements from the correction signal producer 202 to the normalization processor 207 constitute a processor.

The coefficient acquirer 204 acquires, for each image height, the coefficient data corresponding to the image capturing condition in the image capturing for producing the input image, from the memory 209. The reconstruction processor 205, the normalization processor 207 and the correction signal producer 202 produce the correction signal by using the coefficient data. The correction signal applier 203 performs the unsharp masking process on the input image by applying the correction signal thereto to produce the sharpened image. The sharpened image produced by the image processor 104 in this manner is used as a captured image or for producing the captured image. The captured image is stored in the memory 209 in a predetermined format.

An image display unit 112 displays a display image produced by performing a predetermined display process on the sharpened image.

The system controller 106 controls the image sensor 102, the A/D converter 103, the image processor 104 and the image display unit 112. The image capturing optical system controller 105 controls drive of the magnification-varying lens 101c, the aperture stop 101a and the focus lens 101b of the image capturing optical system 101 depending on a control signal from the system controller 106.

Figure 13:
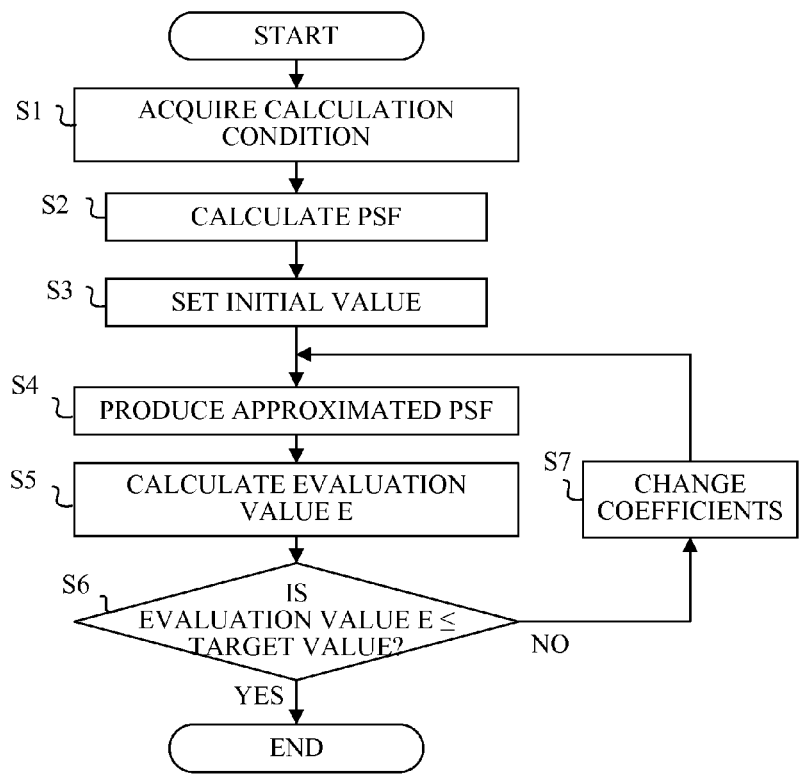
FIG. 13 is a flowchart illustrating a method of calculating coefficients.

Next, description will be made of the above-described method of calculating the coefficient data (coefficients) by the coefficient calculator 208 with reference to a flowchart of FIG. 13. The image processor 104 including the coefficient calculator 208 is constituted by a computer, such as a CPU. The image processor 104 performs the unsharp masking process on the input image according to an image processing program as a computer program. The coefficient calculator 208 calculates the coefficients according to a coefficient calculation program that is part of the image processing program.

First, at step S1, the coefficient calculator 208 acquires information necessary to calculate the coefficients. Specifically, the coefficient calculator 208 acquires, as the information: information on the image capturing condition (i.e., the focal length, the F-number and the image capturing distance) in which the coefficients are calculated; and information on initial values of the coefficients and a target value of an evaluation value E described later, which are to be used to fit the approximation function to the PSF.

Figure 14:
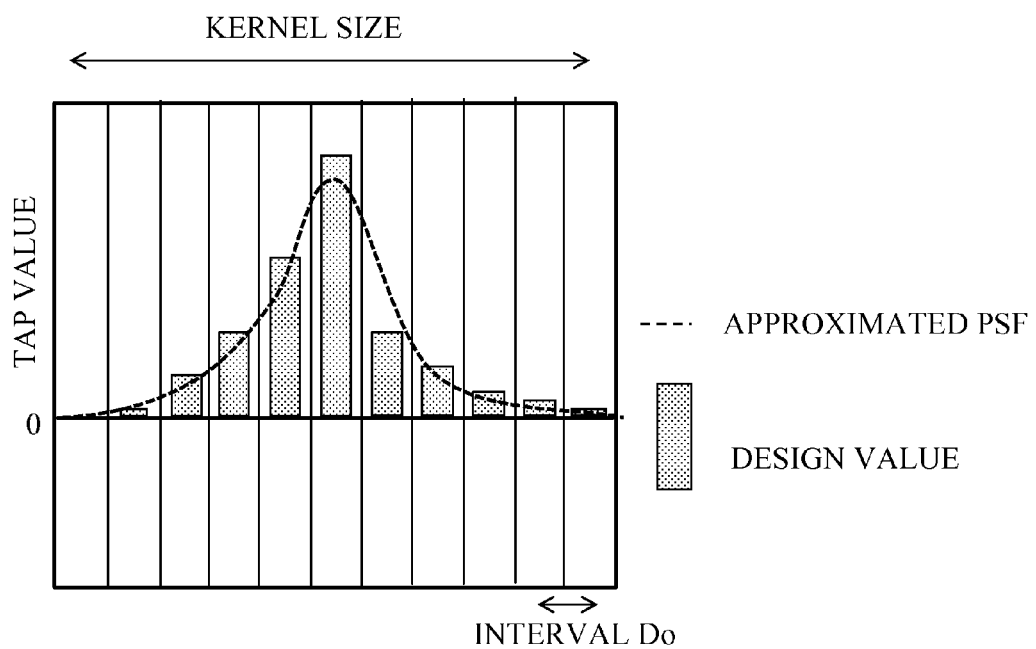
FIG. 14 illustrates a relation between an approximated PSF and a design value.

Subsequently, at step S2, the coefficient calculator 208 calculates the PSF corresponding to the image capturing condition from design value data (reference value data) of the image capturing optical system 101 corresponding to the image capturing condition acquired at step S1. FIG. 14 is a bar chart illustrating the PSF calculated from the design data at this step (hereinafter referred to as "a design PSF"). As illustrated in FIG. 14, the design PSF calculated at this step are divided into N (number of taps) and discretized with an interval Do.

As can be understood from the drawing, a size of the design PSF (kernel size) can be expressed by a product of the interval Do and the number of taps N. For this reason, when any two of the interval Do, the number of taps N and the kernel size of the discretized PSF are known, a remaining one of them is uniquely fixed. For instance, when the number of taps N=11 and the interval Do=2.0 μm, the kernel size is Do·(N−1)=20 μm. A term Do·N may be called the kernel size. In this case, the kernel size is 22 μm. Since the interval Do corresponds to a pitch in the fitting, it is desirable that the interval Do be smaller than a pixel pitch of the image sensor 102. Performing the fitting beforehand with the pitch being set to be small enables dealing with image sensors having various pixel pitches.

Next, at step S3, the coefficient calculator 208 sets the initial values of the coefficients of the approximation function to be used to approximate the PSF acquired at step S1. Description will here be made of a case where the approximation function is expressed by expressions (5), (8) and (9). In the approximation function, the coefficients for which the initial values are set are "a", "b", "μ", "η" and "σ", and are updated in the process illustrated in FIG. 13. For this reason, at this step S3, the coefficient calculator 208 sets temporary initial values. When, in calculation of other capturing optical system, image capturing condition and the like, accurate coefficients or values close thereto are known, the coefficient calculator 208 may set, at this step, such values as the coefficients.

Next, at step S4, the coefficient calculator 208 performs the fitting of the approximation functions to the design PSF by substituting the coefficients set at step S3 into the approximation functions of expressions (8) and (9) to produce an approximated point spread function (hereinafter referred to as "an approximated PSF"). However, since this process derives optimum coefficients by performing the fitting on the design data, the coefficient calculator 208 discretizes the approximated PSF. FIG. 14 illustrates a section of the approximated PSF produced at this step. Number of divisions of and an interval of the approximated PSF are set to be the same as those of the design PSF calculated at step S2.

Next, at step S5, the coefficient calculator 208 evaluates a difference between the design PSF calculated from the design data at step S2 and the approximated PSF produced at step S4. As an index for the evaluation of the difference between the design PSF and the approximated PSF, an evaluation value E is used which is calculated as, for example, a root mean square of the difference between the design PSF and the approximated PSF.

Subsequently, at step S6, the coefficient calculator 208 makes a determination on the coefficients by using the evaluation value E calculated at step S5 and the target values of the coefficients acquired at step S1. The evaluation value E may contain not only information on the difference between the design PSF and the approximated PSF, but also information on the coefficients of the approximated PSF. For instance, when a value range of each of the coefficients is fixed and any coefficient has a value other than those within the value range, weighting may be performed such that the evaluation value E becomes larger, which enables making the fitting more efficient and enables controlling a shape of the approximated PSF. In this determination, the coefficient calculator 208 compares the evaluation value E to the target value. If a result of the comparison shows that the evaluation value E is equal to or smaller than the target value, the coefficient calculator 208 completes the fitting and outputs coefficient data indicating the coefficients used when a latest approximated PSF is produced. Conversely, if the evaluation value E is larger than the target value, the coefficient calculator 208 determines that the fitting has not been sufficiently performed and proceeds to step S7.

Next, at step S7, the coefficient calculator 208 changes the coefficients to be used to produce the approximated PSF. At this step, one or multiple coefficients may be changed. After updating the coefficients, the coefficient calculator 208 returns to step S4 to recalculate the approximated PSF. In this manner, the coefficient calculator 208 repeats the processes from step S4 to step S7 until the evaluation value E converges to the target value or a smaller value at steps S5 and S6. Alternatively, the coefficient calculator 208 may temporarily store the previous evaluation value E for the coefficients before the change and compare the previous evaluation value E to the current evaluation value E for the coefficients after the change. Then, if the changed evaluation value E does not become closer to the target value, the coefficient calculator 208 may return to the step before the change to redo the processes. Otherwise, in order to allow the evaluation value E to become a global minimum value without becoming a local minimum value in the repetition of the change of the coefficients and the calculation of the evaluation value E, the coefficient calculator 208 may return to step S3 to reset the initial value.

The coefficient calculator 208 performs the above-described processes to previously calculate the coefficients of the approximation functions to be used to approximate the PSF corresponding to each of various image capturing conditions of various types of image capturing optical systems and stores the coefficient data in the memory 209. Calculating the coefficient data of the approximated PSF beforehand as just described makes it only necessary to acquire the calculated coefficient data for the unsharp masking process, which enables easily reconstructing the approximated PSF depending on the image capturing optical system and on the information on the image capturing condition and others.

Figure 2:
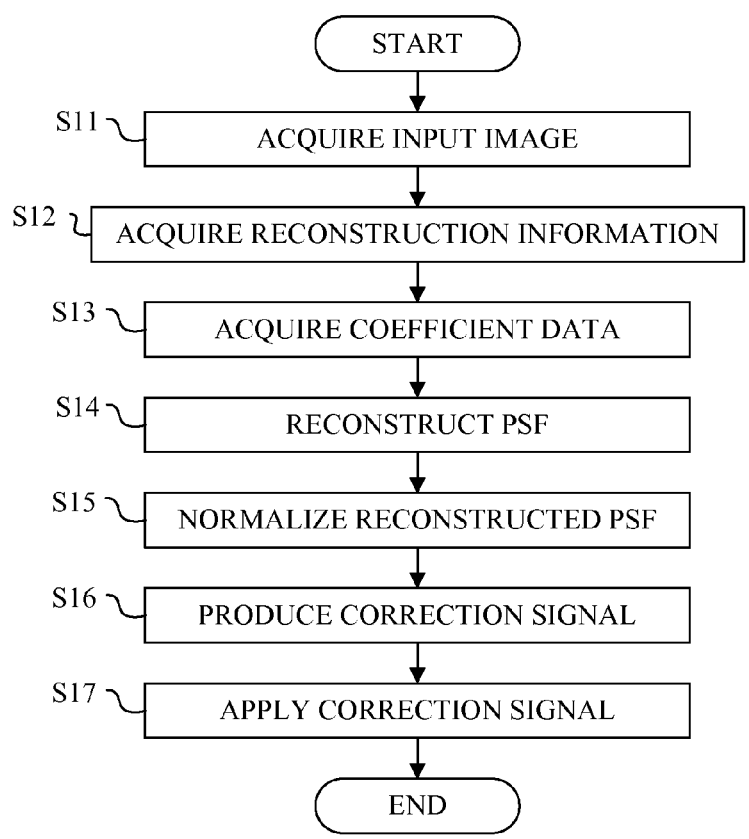
FIG. 2 is a flowchart illustrating an image processing method in Embodiment 1.

Next, with reference to a flowchart of FIG. 2, description will be made of a method of the unsharp masking process (image processing method) of this embodiment. The image processor 104 executes this process according to the above-described image processing program in response to an instruction from the system controller 106.

First, at step S11, the image processor 104 produces the input image (first image) depending on the image capturing. In this embodiment, the image processor 104 uses, as the input image, a G channel image obtained by demosaicing a RAW image acquired from a digital image capturing signal. However, the image processor 104 may treat an R channel image or a B channel image as the input image or may use each of the R, G and B channel images as the input image. Alternatively, the image processor 104 may use the RAW image not subjected to the demosaicing.

Figures 9, 10:
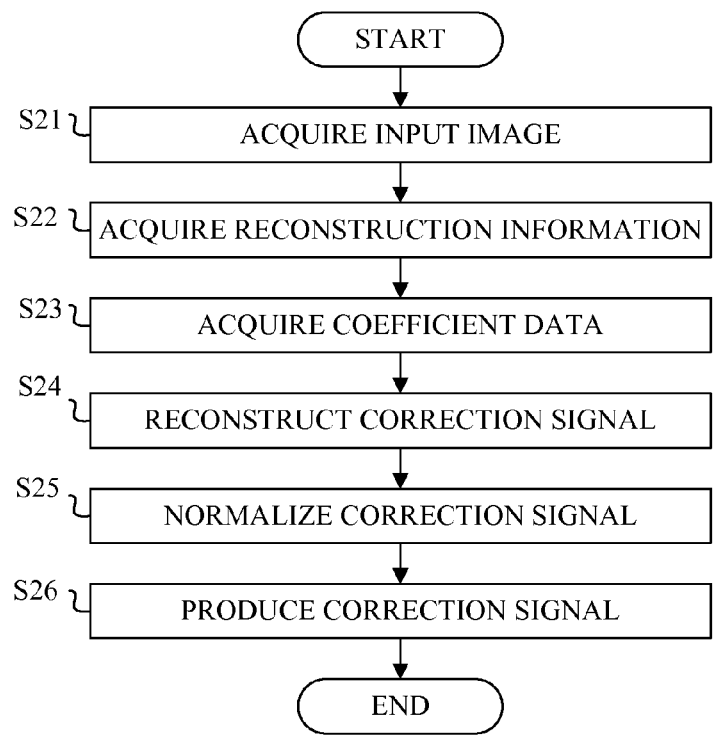
FIG. 9 illustrates a Bayer arrangement.
FIG. 10 is a flowchart illustrating an image processing method in Embodiment 2 of the present invention.

Further alternatively, the image processor 104 may divide the G channel image into G1 and G2 channel images as illustrated in FIG. 9 as a Bayer arrangement and treat each of the G1 and G2 channel images as the input image. Dividing the G channel image into the G1 and G2 channel images allows the extracted R, G1, G2 and B channel images to have mutually identical resolutions, which makes it easier to perform the following processes and data processing.

Next, at step S12, the image processor 104 (reconstruction information acquirer 206) acquires information to be used to reconstruct the PSF (i.e., the above-described approximated PSF). Specifically, the image processor 104 acquires the image capturing condition (e.g., the focal length, the F-number, the image capturing and others), a pixel pitch of the image sensor 102, and the number of taps of the unsharp mask (filter). When the image capturing apparatus is the lens-interchangeable image capturing apparatus, the image processor 104 also acquires an identification number of the interchangeable lens (lens ID) to be used to identify the image capturing optical system. The image capturing condition (and the lens ID) acquired at this step is used to acquire the coefficient data at step S13, which will be described later. On the other hand, the pixel pitch and the number of taps of the filter are used to produce the unsharp mask by discretizing the PSF reconstructed at step S14.

Subsequently, at step S13, the image processor 104 (coefficient acquirer 204) acquires, from the memory 209, the coefficient data necessary to reconstruct the PSF of the image capturing optical system 101 corresponding to the image capturing condition (and the lens ID) acquired at step S12. The coefficient data acquired at this step is coefficient data on dispersion and symmetry of the PSF. The coefficient acquirer 204 acquires data of each coefficient, depending on the image capturing condition.

When the PSF is approximated by the approximation functions expressed by expressions (5), (6) and (7), the coefficient "a" in expression (6) influences the symmetry of the distribution of the PSF. Since the PSF corresponding to the central area of the input image is rotationally symmetric when the image capturing optical system is the rotationally symmetric coaxial optical system, the coefficient corresponding to the central area of the input image has a value equal to or close to zero. On the other hand, the PSF may be asymmetric at a marginal area of the input image due to an influence of an asymmetric aberration such as a comma aberration. As the asymmetry of the PSF increases, the absolute value of the coefficient "a" becomes larger. In expression (7), the coefficient "σ" is a coefficient that influences the dispersion of the distribution. In general, the coefficient "σ" has a smaller value at a closer location to the central area of the input image where the image capturing optical system provides a high optical performance. Conversely, the image capturing optical system provides, in the marginal area of the input image, a lower optical performance compared to that provided in the central area, which increases a dispersion value of the PSF. For this reason, the coefficient "σ" has, in the marginal area, a value larger than that in the central area.

Although, at this step, description was made of the coefficient data used in the approximation of the PSF by the approximation function of expression (5), the PSF may be approximated by using an approximation function other than that of expression (5) to acquire coefficient data of that approximation function. Also in this case, it is only necessary to acquire coefficients corresponding to those in expression (5), namely, the coefficient "σ" that influences the dispersion of the distribution and the coefficient "a" that influences the asymmetry. Alternatively, coefficients that influence the dispersion of the distribution and the asymmetry may be used. For instance, the PSF may be approximated by the same method as the above-described method of calculating the coefficient data by using an Hermite polynomial, a Legendre polynomial or the like instead of the approximation function of expression (5), and coefficients of up to a certain predetermined order may be used as the coefficient data.

Figure 7:
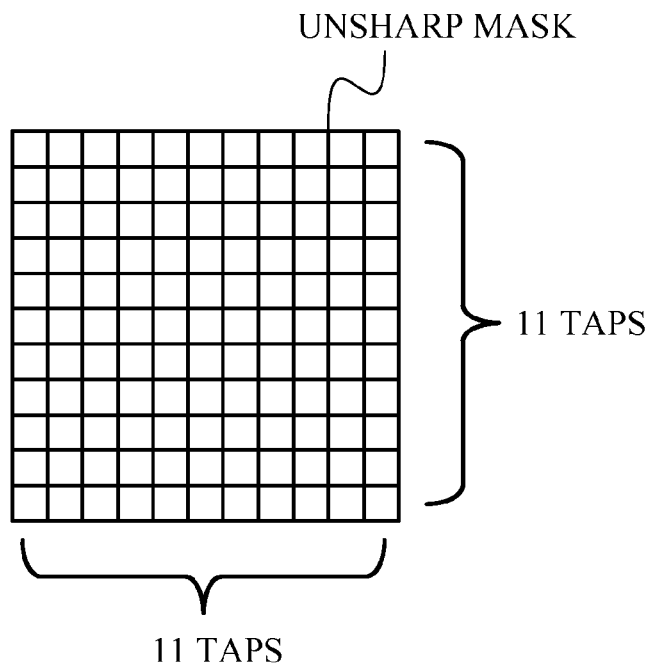
FIG. 7 illustrates an unsharp mask.

This embodiment acquires the coefficient data and reconstructs the PSF depending thereon. This approach enables a more significant reduction of a storage amount required by the memory 209 while keeping good correction accuracy, compared to a case of directly storing data corresponding to the PSF of the image capturing optical system. For instance, when the unsharp mask has 11×11 taps as illustrated in FIG. 7, the memory 209 needs to store data of 121 tap values. When separately storing the data for the R, G and B channel images, the memory 209 has to store data of 363 tap values, which is triple of the former. On the other hand, in the case of storing the coefficients, the use of expressions (5), (8) and (9), which have five coefficients in total, decreases number of the coefficients required to be stored to 15 even when separately storing the coefficients for the R, G and B channel images. As just described, storing the coefficients enables reducing the amount of the data to be stored, significantly more compared to the case of directly storing the data of the respective tap values of the unsharp mask.

Next, at step S14, the image processor 104 (reconstruction processor 205) produces, that is, reconstructs the PSF by substituting the coefficient data corresponding to the image capturing condition acquired at step S13 into the approximation function to be used to approximate the PSF. This embodiment uses the reconstructed PSF as the unsharp mask.

Figure 8:
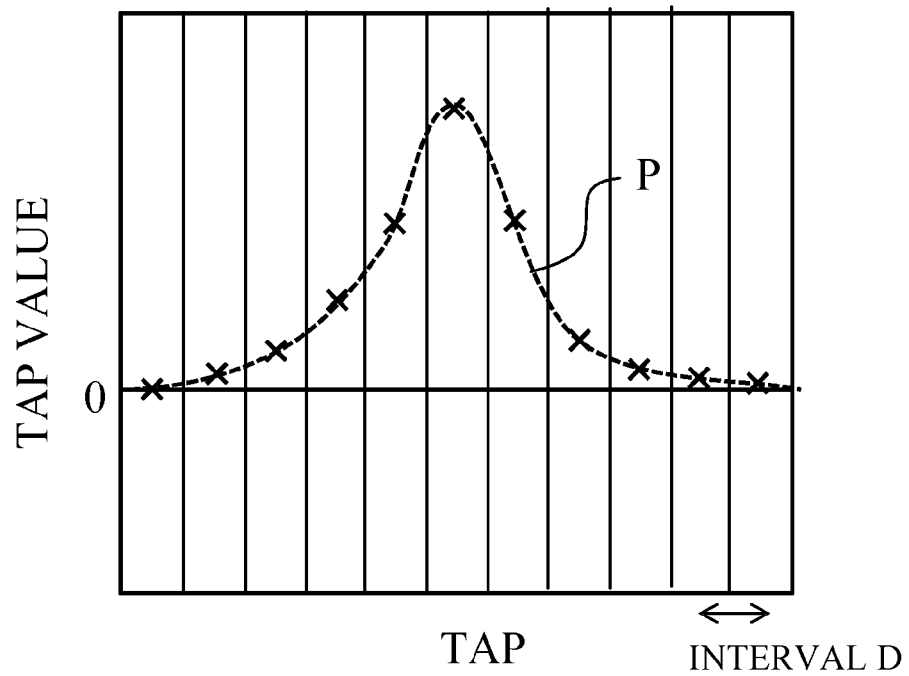
FIG. 8 is a sectional view of the unsharp mask.

Description will here be made of the unsharp mask with reference to FIGS. 7 and 8. As described at step S12, the information on the number of taps of the unsharp mask is acquired at this step. FIG. 7 illustrates, as an example, two-dimensional unsharp mask having 11×11 taps. In the drawing, the tap values (filter coefficients) are not shown. FIG. 8 illustrates the reconstructed PSF and tap values of the unsharp mask. A horizontal axis indicates the tap, and a vertical axis indicates the tap value. A dashed line P indicates the PSF reconstructed by substituting the coefficient data into the approximation function. Symbol "x" denotes the tap value of the unsharp mask set depending on the reconstructed PSF. Performing the discretization and quantization processes on the reconstructed PSF produces the unsharp mask.

An interval D used in the discretization is acquired from the pixel pitch of the image sensor 102. When the coefficient data acquired at step S13 is fitted by the interval Do as illustrated in FIG. 14, the distance D is expressed as:

$$D=P/Do \quad (14)$$

where P represents the pixel pitch.

Discretizing the reconstructed PSF by the interval D enables producing an appropriate unsharp mask corresponding to the pixel pitch of the image sensor 102.

Although, at this step, description was made of the case of performing the reconstruction (production) of the PSF and the production of the unsharp mask by using the pixel pitch of the image sensor and the number of taps of the unsharp mask, the PSF and the unsharp mask can be produced by alternatively using two factors, namely, the size (kernel size) of the unsharp mask as the filter and one of the pixel pitch and the number of taps. This is because, as described above, the product of the interval D calculated from the pixel pitch and the number of taps corresponds to the size of the filter.

Acquiring the above-described two kinds of information at step S12 enables producing the appropriate unsharp mask.

Next, at step S15, the image processor 104 (normalization processor 207) performs a normalization process on the unsharp mask. Although this embodiment discretizes the PSF by the interval D as illustrated in FIG. 8, a shape of the unsharp mask varies depending on the image sensor 102 (that is, depending on the image capturing apparatus) even when the number of taps is fixed. This is because the interval D depends on the pixel pitch.

An image-blurring filter to be used as the unsharp mask is typically designed such that a sum of luminance values of images before and after being blurred is stored, which is required to be satisfied also in this embodiment. For instance, two types of unsharp masks, which are produced depending on PSFs reconstructed depending on identical coefficient data, whose numbers of taps are mutually identical and in which a pixel pitch of one thereof is twice of that of the other, have sums of the tap values, one of which is quadruple of the other. This difference in the sum of the tap values of the unsharp mask causes a problem that when the sharpening by the unsharp masking process expressed by expression (13) is performed, the sums of luminance values of the images before and after the process are mutually different depending on the sum of the tap values. As a countermeasure against this problem that enables appropriately performing the unsharp masking process even if the pixel pitch changes, the sum of the tap values of the unsharp mask is adjusted at this step such that the sum of the tap values is fixed to a predetermined value.

As the normalization process in this embodiment, the normalization processor 207 calculates the sum of the tap values of the unsharp mask and then divides each of the tap values by the sum of the tap values. This division results in a constant value of 1 (predetermined value) as the sum of the tap values of the unsharp mask. This unsharp mask is used as a normalized unsharp mask. Instead of performing this division, an inverse of the sum may be multiplied.

Although the sum of the tap values may not strictly be 1 due to an influence of a floating point accuracy of each of the tap values, it is only necessary, in this embodiment, to adjust the sum of the tap values such that the sum has a value close to 1 (predetermined value) because a slight error is acceptable.

Although this embodiment performs the normalization by the division, the normalization may be performed by using other method than the division. For instance, the normalization may be performed by calculating the sum of the tap values and then adding a difference between the sum and 1 to a specific tap value (e.g., a maximum tap value and a tap value of a central tap).

Furthermore, when the sum of the tap values is not the value close to 1 in the normalization process, its excess or deficiency may be adjusted at a position of the maximum tap value of the unsharp mask, or the unsharp mask may be multiplied by a constant so as to reduce the excess or deficiency.

Subsequently, at step S16, the image processor 104 (correction signal producer 202) produces the correction signal by using the unsharp mask produced at step S15. When the unsharp masking process is performed by using expression (13), $[\delta(x,y)+m\times(\delta(x,y)-USM(x,y))]$ which is the bracketed portion of expression (13) provides the correction signal as described above. As described above, as for the delta function $\delta(x,y)$, only a central tap thereof has a value. Therefore, when the delta function has 11×11 taps that is the same number of the taps of the unsharp mask, $\delta(6,6)=1$.

The production of the correction signal at this step may be performed by calculating (δ(x,y)−USM(x,y)), multiplying a result thereof by the constant m and then adding δ(x,y) to a result of the multiplication, or the central tap value of δ(x,y) may be separately calculated. In this case, a calculation in which the unsharp mask USM(x,y) is multiplied by the constant m, a sign of its result is inversed and then (1+m) is added to the central tap value is an equivalent calculation to one described above. Although description is here made of δ(x,y) in the case where only the central tap has the value, the delta function may have a value in a predetermined tap which is not the central tap but a tap corresponds to a tap having a maximum tap value in USM(x,y).

The constant m is set with consideration of a noise contained in the image and the excess and deficiency in the correction of the sharpening. As described above, the constant m is the adjustment value used to vary the correction amount. Setting the constant m to a larger value provides a stronger correction effect, and setting the constant m to a smaller value provides a weaker correction effect.

Finally, at step S17, the image processor 104 (correction signal applier 203) applies the correction signal (correction filter) produced at step S16 to the input image. That is, the image processor 104 performs the unsharp masking process on the input image. When performing the unsharp masking process expressed by expression (13), convoluting the input image with the correction signal produced at step S16 enables producing the sharpened image.

The image processor 104 is capable of, by performing the above-described process, being compatible with various combinations of the image capturing optical system and the image sensor and performing the unsharp masking process with a reduced amount of the data required to be stored to be used for the process.

Although this embodiment described the case of producing the unsharp mask depending on the PSF of the optical system, it is desirable to vary the unsharp mask depending on the image height for increasing the correction accuracy because the PSF varies depending on the image height. FIG. 15A illustrates a relation between each position of the unsharp mask produced at step S14 and the input image. Each white-filled circle in the drawing shows the position of the unsharp mask to be produced. Dividing the input image into a nine-by-nine matrix produces unsharp masks at 81 positions corresponding to intersections of dividing lines. Performing a linear interpolation or the like on the unsharp masks enables producing an unsharp mask at an arbitrary position in the input image and consequently dealing with the variation of the PSF depending on the image height. Number of divisions of the input image may be less than 9×9 to reduce the data amount of the unsharp mask or may be larger than 9×9 to improve the correction accuracy.

Although the unsharp masks can be produced by reconstructing the PSF directly at the positions shown by the white-filled circles in FIG. 15A, the unsharp masks at these positions may be produced alternatively by the interpolation. FIG. 15B illustrates an example of the unsharp masks produced by the interpolation. In the drawing, each black-filled circle shows the position of the unsharp masks produced at step S14. In general, since the PSF of the image capturing optical system is rotationally symmetric to an optical axis, unsharp masks produced on a basis of the PSF are also rotationally symmetric. In the example illustrated in FIG. 15B, through utilization of this characteristic, the unsharp masks located at 10 positions in a down direction with respect to the center of the image are produced, and then, while the unsharp masks are rotated about the center of the image, the unsharp mask at each of the positions corresponding to the white-filled circles is produced by the interpolation. This approach eliminates the need for producing the unsharp masks at the positions one by one, which enables reducing a processing load.

As a method other than the above-described unsharp mask interpolation process, performing, in the same manner as that described above, the interpolation process on the coefficient data to be used to reconstruct the PSF and on the PSF to be reconstructed enables dealing with the variation of the PSF depending on the image height.

Moreover, although this embodiment described, at step S11, the case where the demosaiced image is treated as the input image, each of the channel images extracted from the RAW image can be treated as the input image, as described above. In this case, a flow of the process is basically the same as that illustrated in the flowchart of FIG. 2, and only the reconstruction process at step S14 is different from that of the flowchart.

When the demosaiced image is treated as the input image, the PSF is reconstructed at step S14 and then discretized by the interval D in the production of the unsharp mask. The interval D, which can be expressed by expression (14), varies when each of the channel images extracted from the RAW image is treated as the input image. When the input image has a pixel array illustrated in FIG. 9, and P represents the pixel pitch of the demosaiced image, a pitch between mutually adjacent pixels in an identical channel is 2P, which is double of the pixel pitch P. For this reason, the interval D in the production of the unsharp mask is expressed as:

$$D=2P/Do. \tag{15}$$

Discretizing the PSF reconstructed by the interval D acquired by using expression (15) enables producing an appropriate unsharp mask even when each of the channel images extracted from the RAW image is treated as the input image. Since steps other than step S14 are the same as those in the case where the demosaiced image is treated as the input image, description thereof is omitted. As described above, the demosaiced image and each of the channels extracted as the images can be treated as the input image only by changing the interval D, which enables switching the process of step S14 depending on the input image.

Embodiment 2

Next, description will be made of an image capturing apparatus including an image processing apparatus (image processor 104) that is a second embodiment (Embodiment 2) of the present invention. A configuration of the image capturing apparatus of this embodiment is the same as that of the image capturing apparatus of Embodiment 1. Instead of the unsharp masking process illustrated by the flowchart of FIG. 2 in Embodiment 1, this embodiment performs a sharpening process shown by a flowchart of FIG. 10. Embodiment 1 reconstructs the PSF from the coefficient data, produces an unsharp mask from the PSF, normalizes the unsharp mask and then produces the correction signal. On the other hand, though this embodiment reconstructs the PSF from the coefficient data as in Embodiment 1, this embodiment produces the correction signal directly from the PSF and normalizes the correction signal. That is, this embodiment is different from Embodiment 1 in that it produces the correction signal from the coefficient data and in that it normalizes the correction signal. Description will be made below of the differences. Although the sharpening process of this embodiment does not directly use the unsharp mask, this embodiment performs a process theoretically the same as the unsharp masking process. For this reason, the sharpening process of this embodiment is also referred to as "an unsharp masking process".

Since steps S21 and S22 in FIG. 10 are the same as steps S11 and S12 of Embodiment 1 (FIG. 2), description thereof is omitted.

At step S23, as at step S13 of Embodiment 1, the image processor 104 (coefficient acquirer 204) acquires, from the memory 209, coefficient data required to reconstruct the PSF of the image capturing optical system 101 corresponding to the image capturing condition (and a lens ID) acquired at step S23. The coefficient acquirer 204 also acquires the constant m as one of the coefficients in this embodiment.

Next, at step S24, the image processor 104 (the reconstruction processor 205 and the correction signal producer 202) reconstructs the PSF from the coefficient data acquired at step S23 and produces the correction signal from the PSF. Embodiment 1 reconstructs the PSF from the coefficient data, produces the unsharp mask and then produces the correction signal from the unsharp mask. As described at step S16, in the unsharp masking process expressed by expression (13), when, as for the delta function $\delta(x,y)$, only the central tap thereof has the value, the correction signal can be produced by operations such as the adjustment by the coefficient m and the change of the value of the central tap (predetermined tap). For this reason, treating the value of the predetermined tap as one coefficient enables producing the correction signal directly from the coefficient data containing that coefficient.

Specifically, as at step S14 of Embodiment 1, the reconstruction processor 205 reconstructs the PSF from the coefficient data acquired at step S23. Differently from step S14 of Embodiment 1, at which the unsharp mask is produced by discretizing the reconstructed PSF by the interval D, at step S24 of this embodiment, the correction signal producer 202 produces a discretized correction signal directly from the PSF.

FIG. 16 illustrates the PSF reconstructed in this embodiment and the correction signal produced from the PSF. In FIG. 16, a horizontal axis indicates a tap of a correction filter that is the discretized correction signal, a vertical axis indicates a value of each tap, a dashed line P indicates the PSF reconstructed from the coefficient data, and symbol "x" denotes a value of the correction signal corresponding to each of the taps. When performing the unsharp masking process expressed by expression (13), in the production of the correction signal, the image processor 104 inverses a sign of the PSF, multiplying the PSF by m by using the acquired coefficient m, and then performs discretization and quantization processes. FIG. 16 illustrates a case where m=1.

Adding (1+m) to the predetermined tap produces the correction signal shown by symbol "x" in FIG. 16. As described above, since this embodiment performs the additional calculation for the predetermined tap, the value of the predetermined tap may be calculated in advance and acquired as one of the coefficients at step S23.

Figure 17A:
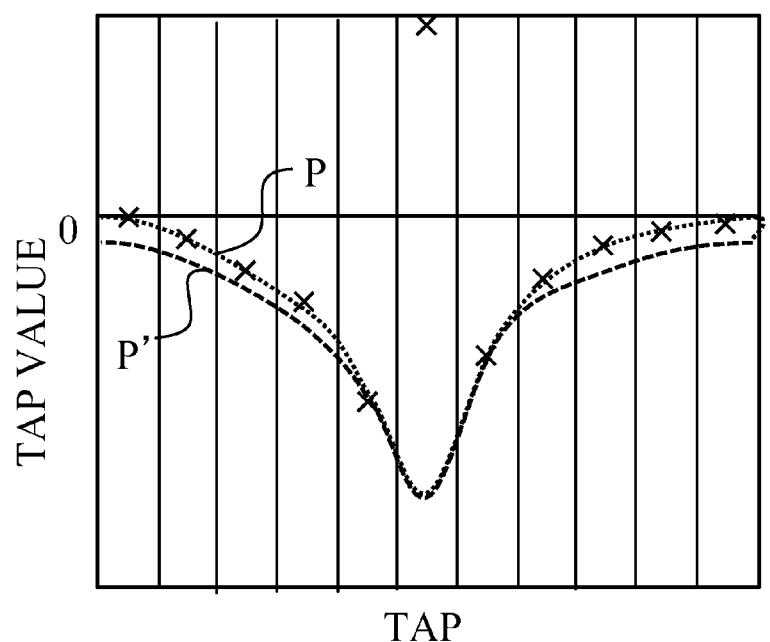
FIGS. 17A and 17B are a sectional view of an adjusted correction signal.

A dashed line P in FIG. 17A indicates the reconstructed PSF whose size is larger than the kernel size illustrated in FIG. 16. As described above, when the size of the reconstructed PSF is larger than the kernel size and is not close to 0 at the marginal area, discretizing the PSF to produce the correction filter (correction signal) decreases a sharpening effect provided by the correction filter.

More specifically, in an area of the input image which has an especially large contrast ratio, discontinuity of filter coefficients is considerably generated, leading to inappropriate sharpening. This problem occurs when the number of the taps of the filter is smaller compared to that of the PSF of the image capturing optical system and therefore information on the marginal area is missing. For this reason, this problem can be solved by increasing the number of the taps. However, when the number of the taps is fixed, that is, the number is fixed as specifications, it is necessary to solve this problem by other methods.

Figure 17B:
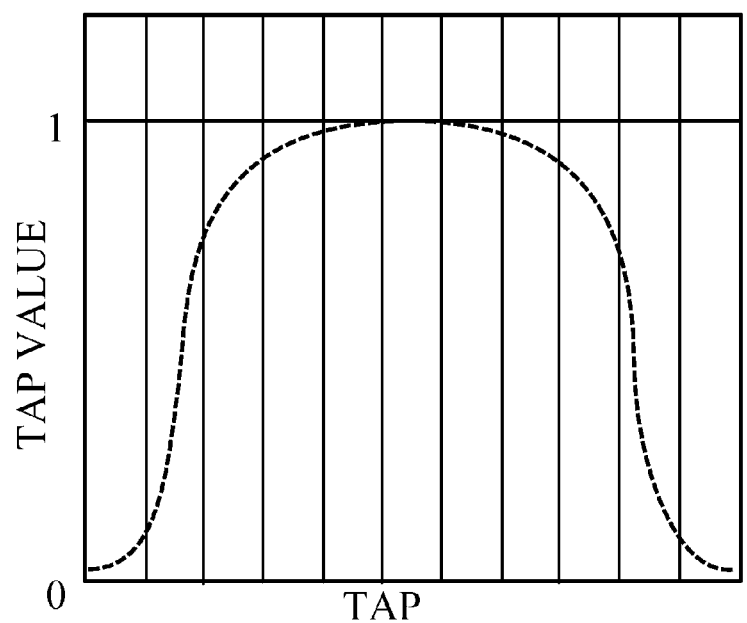

As one of the other methods to solve this problem, a distribution having a tap value of approximately 1 at its central area and having tap values continuously decreasing to 0 toward its marginal areas as indicated by a dashed line in FIG. 17B is multiplied by the reconstructed PSF to adjust the PSF such that the PSF has a distribution indicated by the dotted line P in FIG. 17A. Then, producing the correction signal from the adjusted PSF indicated by the dotted line P in FIG. 17A enables reducing the above-described influence.

Alternatively, the distribution indicated by the dashed line in FIG. 17B may be stored as discrete data, and the discretized PSF may be multiplied by that distribution.

Subsequently, at step S25, the image processor 104 (normalization processor 207) performs the normalization process on the correction signal. Since the correction signal in the unsharp masking process expressed by expression (13) is the bracketed portion of expression (13), it is necessary to set also the sum of the tap values of the correction signal to 1. As a method of normalizing the correction signal, each method described at step S15 of Embodiment 1 may be used. An accuracy of the normalization method only has to be within a certain allowable range. Furthermore, even when the sum of the tap values is not the value close to 1, the correction signal may be subjected to the adjustment or the like as in Embodiment 1.

Although this embodiment normalizes the correction signal, the correction signal may be produced after a value of $(\delta(x,y)-USM(x,y))$ in expression (13) is acquired from the reconstructed PSF and then normalized. In this case, the sum of the tap values is adjusted in the normalization such that the sum is not 1, but 0 (predetermined value).

Finally, at step S26, the image processor 104 (correction signal applier 203) applies the correction signal (correction filter) produced at step S25 to the input image. That is, the image processor 104 performs the unsharp masking process on the input image.

The image processor 104 is capable of, by performing the above-described process, being compatible with various combinations of the image capturing optical system and the image sensor and performing the unsharp masking process with a reduced amount of the data required to be stored to be used for the process.

Although each of the above embodiment describes the case where the image processor 104 corresponding to the image processing apparatus is integrated with the image capturing apparatus, the image processing apparatus may be an apparatus separate from the image capturing apparatus, such as a personal computer.

Each of the above embodiments enables performing an accurate sharpening process that requires less data storage amount to produce a point spread function (PSF) of an image capturing optical system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-214688, filed on Oct. 21, 2014, which is hereby incorporated by reference wherein in its entirety.

What is claimed is:

1. An image processing apparatus configured to perform an image process on a first image produced by image capturing through an image capturing optical system, the image processing apparatus comprising:
a memory storing coefficient data containing coefficients to be used in an approximation function to approximate a point spread function of the image capturing optical system, the coefficients having values different depending on an optical state of the image capturing optical system; and
a processor configured to perform the image process,
wherein the processor is configured to:
produce an approximated point spread function by using the coefficient of the coefficient data corresponding to the optical state in the image capturing;
produce a filter by using the approximated point spread function, a pixel pitch of an image sensor used for the image capturing, and at least one of a kernel size of the filter to be used for a sharpening process on the first image and number of taps of the filter; and
produce a second image that is a sharpened image by applying the filter to the first image.

2. An image processing apparatus according to claim 1, wherein the processor is configured to produce the coefficient data by fitting the approximation function with the point spread function calculated by using reference value data of the image capturing optical system.

3. An image processing apparatus according to claim 1, wherein the coefficient data contains a coefficient that provides asymmetry to the approximated point spread function.

4. An image processing apparatus according to claim 1, wherein the coefficient data contains a coefficient to adjust a gain of the filter.

5. An image processing apparatus according to claim 1, wherein the processor is configured to produce an unsharp mask by using the approximated point spread function and to produce the filter by using the unsharp mask.

6. An image processing apparatus according to claim 1, wherein the processor is configured to produce the filter depending on the approximated point spread function without producing the unsharp mask.

7. An image processing apparatus according to claim 1, wherein the processor is configured to perform a normalization process for setting a sum of values of the taps of the filter to a predetermined value and to apply the filter subjected to the normalization process to the first image.

8. An image processing apparatus according to claim 1, wherein:
the processor is configured to:
perform an adjustment of the approximated point spread function such that the approximated point spread function has a distribution that continuously decreases to zero from its central area toward its marginal area; and
to produce the filter by using the approximated point spread function subjected to the adjustment.

9. An image capturing apparatus comprising:
an image sensor configured to perform image capturing through an image capturing optical system; and
an image processing apparatus configured to perform an image process on a first image produced by using output from the image sensor,
wherein the image processing apparatus comprises:
a memory storing coefficient data containing coefficients to be used in an approximation function to approximate a point spread function of the image capturing optical system, the coefficients having values different depending on an optical state of the image capturing optical system; and
a processor configured to perform the image process,
wherein the processor is configured to:
produce, as the image process, an approximated point spread function by using the coefficient of the coefficient data corresponding to the optical state in the image capturing;
produce a filter by using the approximated point spread function, a pixel pitch of the image sensor used for the image capturing, and at least one of a kernel size of the filter to be used for a sharpening process on the first image and number of taps of the filter; and
produce a second image that is a sharpened image by applying the filter to the first image.

10. An image processing method configured to perform an image process on a first image produced by image capturing through an image capturing optical system, the method comprising:
providing coefficient data containing coefficients to be used in an approximation function to approximate a point spread function of the image capturing optical system, the coefficients having values different depending on an optical state of the image capturing optical system; and
performing the image process,
wherein the image process comprises:
producing an approximated point spread function by using the coefficient of the coefficient data corresponding to the optical state in the image capturing;

producing a filter by using the approximated point spread function, a pixel pitch of an image sensor used for the image capturing, and at least one of a kernel size of the filter to be used for a sharpening process on the first image and number of taps of the filter; and producing a second image that is a sharpened image by applying the filter to the first image.

11. A non-transitory computer-readable storage medium storing an image processing program as a computer program configured to cause a computer to:

provide coefficient data containing coefficients to be used in an approximation function to approximate a point spread function of an image capturing optical system, the coefficients having values different depending on an optical state of the image capturing optical system; and perform the image process, wherein the image process comprises:

producing an approximated point spread function by using the coefficient of the coefficient data corresponding to the optical state in the image capturing;

producing the filter by using the approximated point spread function, a pixel pitch of an image sensor used for the image capturing, and at least one of a kernel size of the filter to be used for a sharpening process on the first image and number of taps of the filter; and producing a second image that is a sharpened image by applying the filter to the first image.

\* \* \* \* \*